W. SHAW.
SORTING AND GAGING APPARATUS.
APPLICATION FILED FEB. 24, 1913.

1,226,917.

Patented May 22, 1917.
9 SHEETS—SHEET 3.

WITNESSES
Doris Brewer
H. G. Grover

INVENTOR
WILLIAM SHAW
BY
Ira J. Adams
ATTORNEY

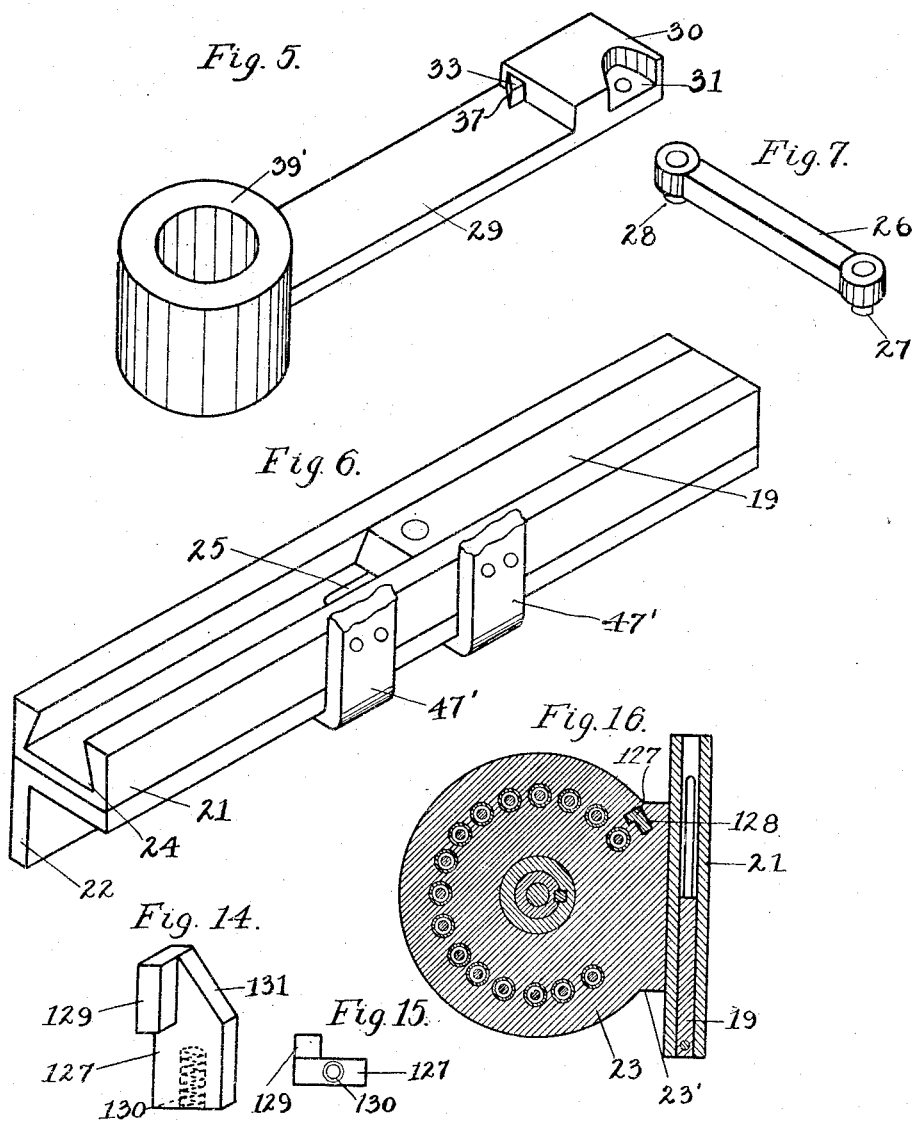

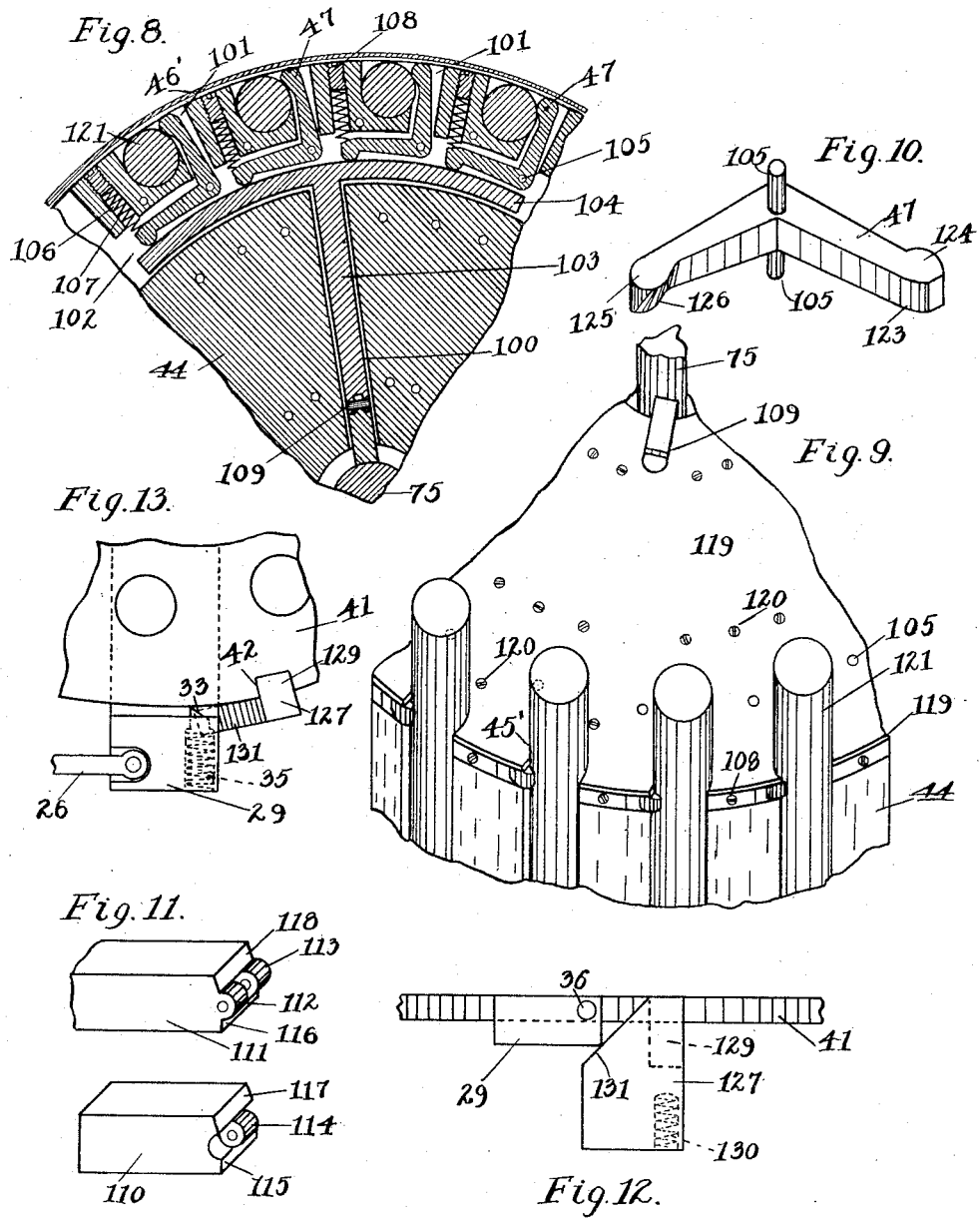

W. SHAW.
SORTING AND GAGING APPARATUS.
APPLICATION FILED FEB. 24, 1913.

1,226,917.

Patented May 22, 1917.
9 SHEETS—SHEET 7.

WITNESSES

INVENTOR
WILLIAM SHAW
BY
ATTORNEY

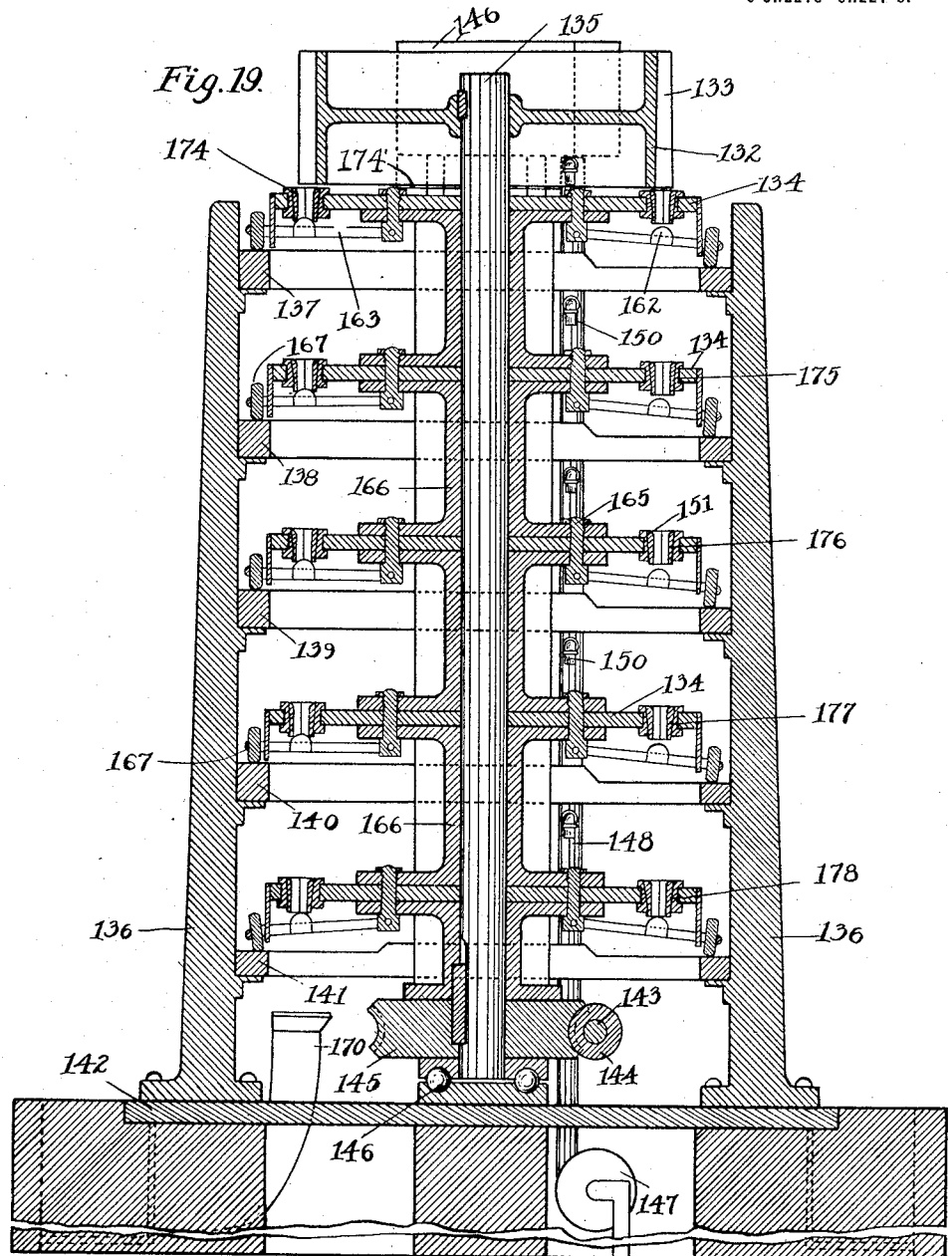

W. SHAW.
SORTING AND GAGING APPARATUS.
APPLICATION FILED FEB. 24, 1913.
1,226,917.
Patented May 22, 1917.
9 SHEETS—SHEET 9.
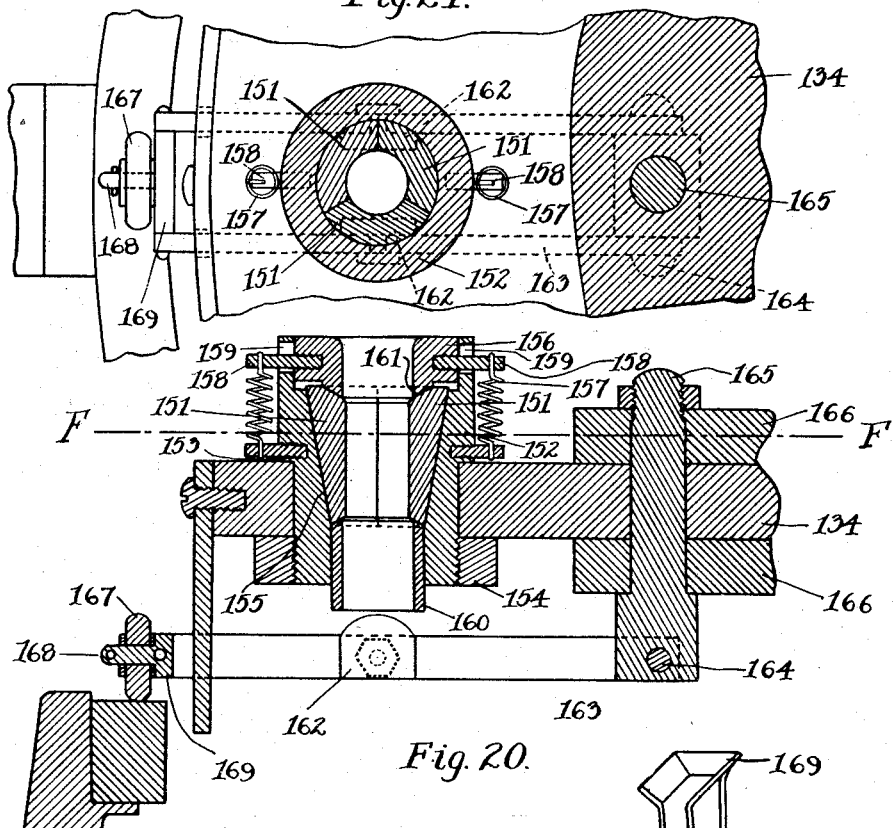
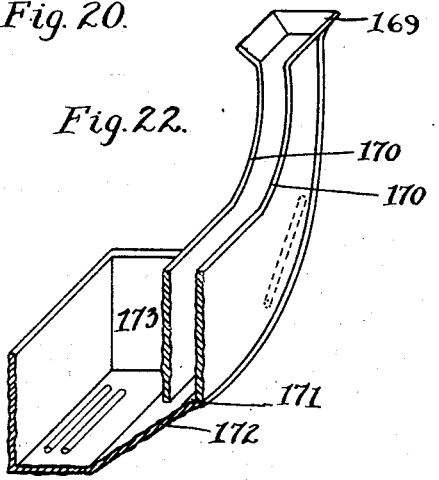
WITNESSES
INVENTOR
WILLIAM SHAW
BY
ATTORNEY

UNITED STATES PATENT OFFICE.

WILLIAM SHAW, OF LAKEWOOD, OHIO, ASSIGNOR TO NATIONAL CARBON COMPANY, OF CLEVELAND, OHIO, A CORPORATION OF NEW JERSEY.

SORTING AND GAGING APPARATUS.

1,226,917.  Specification of Letters Patent.  Patented May 22, 1917.

Application filed February 24, 1913. Serial No. 750,142.

*To all whom it may concern:*

Be it known that I, WILLIAM SHAW, a subject of the King of England, residing at Lakewood, in the county of Cuyahoga and State of Ohio, have invented a certain new and useful Improvement in Sorting and Gaging Apparatus, of which the following is a full, clear, and exact description.

This invention relates to an improved means for gaging and sorting articles. The articles particularly referred to are carbon rods, such as arc light electrodes, battery electrodes, etc., although the device may be used for the same purpose with many other bodies. The apparatus as shown is particularly adapted for sorting arc light electrodes into the different diameters contained in a certain lot. It may obviously be used for other articles to be accurately separated within certain limits of diameters.

One of the objects of this invention is to decrease the amount of labor and time required in the ordinary method of hand sorting such articles.

Another object is to secure more accurate sorting of these articles.

A third object of my invention is to secure an apparatus which is adaptable for various sizes of rods, or similar articles.

Other objects will appear in the appended descriptions.

In the drawings:—

Fig. 5 is an isometric view of the engaging arm which rotates the feeding cylinder of the apparatus.

Fig. 6 is an isometric view of the slide which actuates the arm shown in Fig. 5.

Fig. 7 is an isometric view of the connecting link for the parts shown in Figs. 5 and 6.

Fig. 8 is an enlarged cross-sectional view of a part of the arrangement used for holding the rods in position and is taken on the line C—C of Fig. 2.

Fig. 9 is an enlarged perspective view of a part of the top, showing the manner in which the rods are held in place.

Fig. 10 is an enlarged detail view of the catch for holding the carbons shown in Fig. 8.

Fig. 11 is a detail view of the hinge motion used to prevent the carbons from being released on the upward stroke of the shaft.

Fig. 12 is an end view with certain parts removed, showing details of the engaging arm and a catch used to hold the cylinder rigid while the engaging arm is being returned.

Fig. 13 is a top view of the parts shown in Fig. 12.

Fig. 14 is an isometric view of the catch shown in Figs. 12 and 13.

Fig. 15 is a bottom view of the catch shown in Fig. 14.

Fig. 16 is a cross-sectional view on the line D—D of Fig. 2 showing the relation of the catch in Figs. 12, 13, 14, and 15.

Fig. 19 is a cross-sectional view of the apparatus shown in Fig. 18 taken on the line E—E of Fig. 18.

Fig. 20 is a cross-sectional view of the split die used in the modification shown in Figs. 17, 18, and 19, and is taken through the center of the die.

Fig. 21 is a cross-section of the split die taken on the line F—F of Fig. 20.

Fig. 22 is a perspective view of a guide way and hopper used to convey the articles to the receiving hopper.

Heretofore in gaging the diameters of carbon rods such as used in ordinary arc lamps, the entire operation has been a manual process. The rods are tried successively in dies of various sizes. The operator first places the carbon in the smallest die and then tries the carbon sucessively in each larger die, until a die is found of such diameter that the carbon will slide through without sticking. After sliding through such a die the carbon is conducted into a larger hopper which contains the carbons which will pass through the die in connection therewith.

In my apparatus, the sorting is done on the same plan as in the manual operation, but it is entirely automatic after placing the carbons into the supply hopper. The carbons are placed in a hopper and by means of my mechanism are delivered and sorted into the various sizes. For the purpose of conveniently describing the operation of the invention, I will assume that the objects to be gaged are carbon rods, which vary in size from .490 to .510 and these are sorted into lots between the sizes of .490 to .495; .495 to .5 and .5 to .505 and .505 and above, although it will be understood that these sizes are adopted merely for the purpose of illustration.

Figure 1:
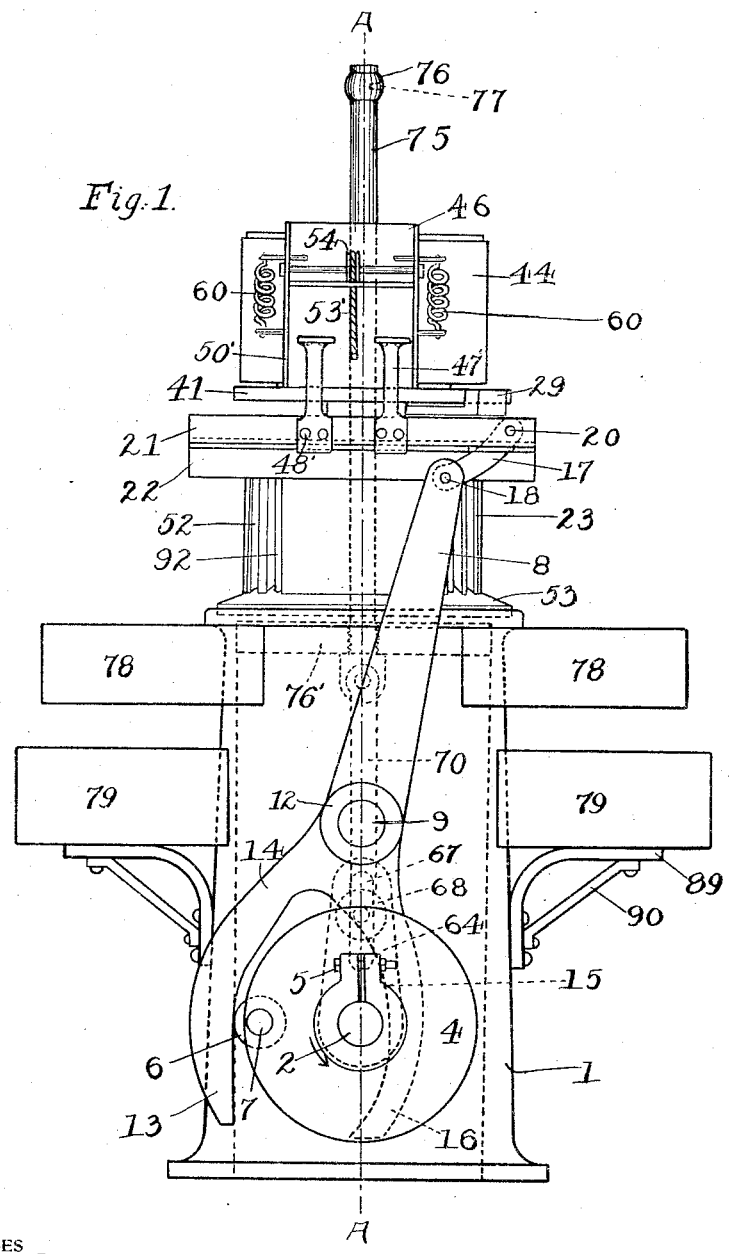
Figure 1 is a front view of one form of my machine.
Figure 2:
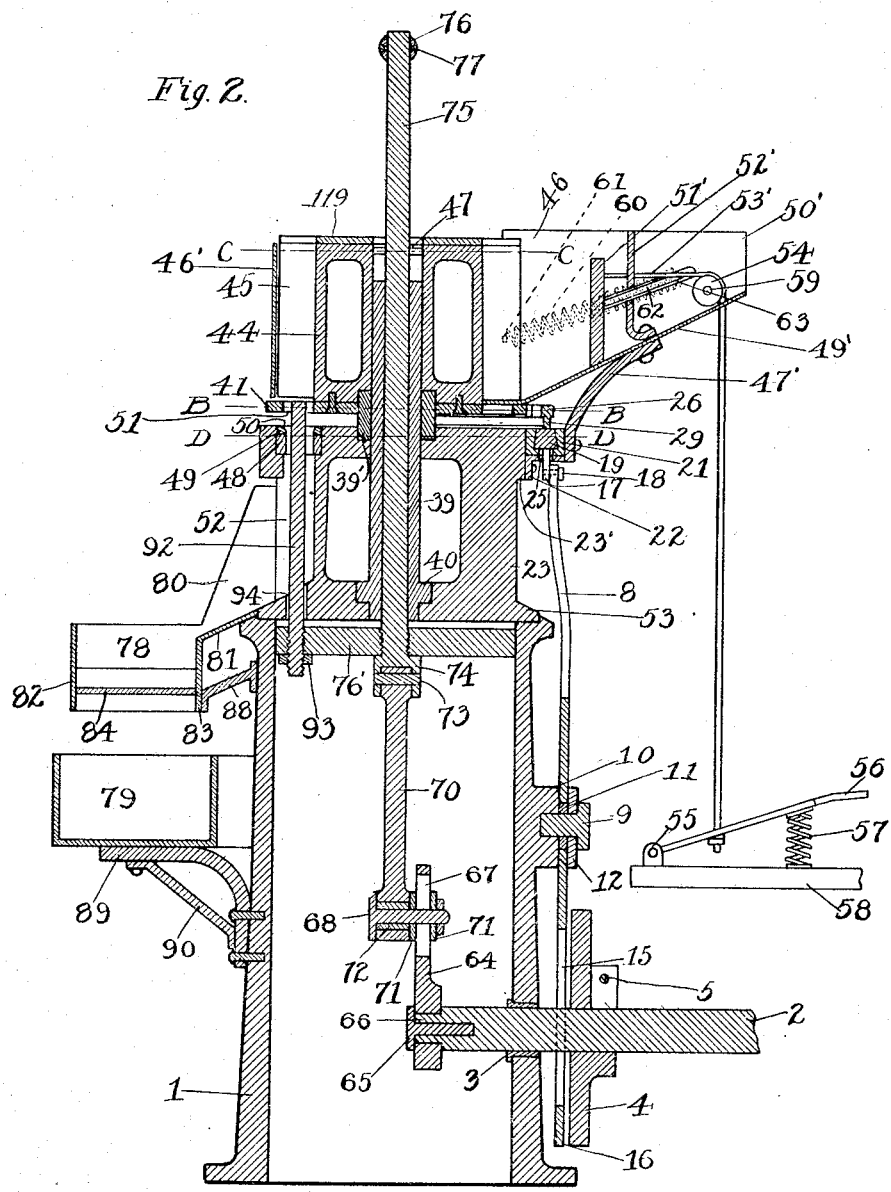
Fig. 2 is a cross sectional view of the apparatus taken on the line A—A of Fig. 1 at right-angles to the view shown in that figure.

Referring to Figs. 1 and 2, a cylindrical supporting drum 1 serves as a frame upon which the entire machine is supported. A shaft 2, driven by any source of power, revolves in a suitable bearing 3 which for the purpose of illustration is shown fitted in the drum 1. Two movable systems are operated from the shaft, one internally and the other externally to the drum.

The external system consists of a disk or face plate 4 adjustably secured to the shaft 2 by means of the bolt 5. A hardened steel roller 6 is fastened to the plate on the surface nearest the drum by pin 7 and actuates a cam lever 8. The cam lever 8 is pivoted at 9 to a projection 10 of the supporting drum. A good bearing surface for the cam lever to rotate upon is provided by the bearing 11 and washer 12. The cam surface of the cam lever 8 may be divided into four portions: 13, 14, 15, and 16, located on the cam in the positions shown. The function of each surface will be described later.

The internal system, which will later be described in detail, consists of the crank 64 keyed or otherwise fastened to the end of the shaft, a connecting rod 70 which is connected to the crank 64 and to shaft 75 and has a cam surface 76 thereon. The shaft 75 is secured in the head 76′ which has rods 92 fastened vertically therein. The rotation of the shaft 2 produces an upward and downward movement of the rods 92.

The upper end of the cam lever 8 is connected by pin 18 to link 17, and pin 20 connects the link to slide 19. The slide 19 moves in the channel 21 shown in detail in Fig. 6. The channel rests on an angle iron 22 which is bolted to the stationary drum 23 at the flat portion 23′, best shown in Figs. 4 and 16. The inner surface of the channel diverges toward the bottom at 24 so as to hold the slide therein. A slot 25 is cut through the bottom of the channel and the supporting angle, of a length greater than the travel of the slide, so as to allow the link 17 to move it back and forth.

Figure 4:
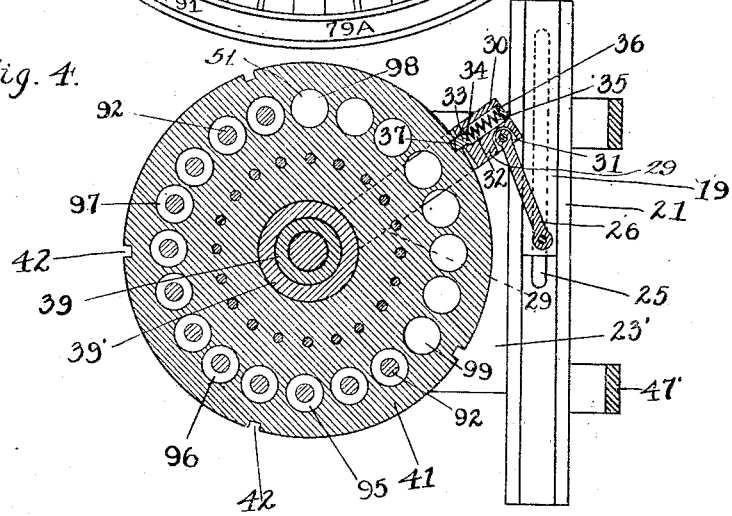
Fig. 4 is a cross-sectional view taken on the line B—B of Fig. 2.

The upper surface of the slide is connected by a link 26 and pins 27, 28 (Fig. 7) to an arm 29 shown in detail in Fig. 5. The position of the slide, channel, link and arm is shown in Fig. 4. Referring to Figs. 4 and 5, the arm 29 has a raised portion 30, a part 31 of which is cut away to allow the link 26 to be connected thereto. Link 26 is counter-sunk therein and rotatable through a small angle. A hole 32 is also cut in the upper portion to allow a catch 33 to be inserted therein and retained by the collar 34. A spring 35 actuates the catch and is retained in the hole by the screw 36. The catch has a slanting surface 37 which permits it to operate the plate 41 in one direction only. The other end of the arm has a head 39′ movably fitted around the sleeve 39 which rests on drum 23 at the collar 40 as shown in Fig. 2.

Referring to Figs. 1, 2, and 4, catch 33 engages the plate 41 by means of the notches 42 so as to rotate the plate. These notches are spaced apart a distance of one-fifth of the circumference or 72 degrees. The plate 41 rotates about the sleeve as an axis and is connected by means of screws to the rotating drum 44, which turns about the sleeve 39 and rests on the head 39′.

The drum 44 has grooves 45 therein into which the rods are fed from the hopper 46. A shield 46′ surrounds the drum at all places except at the hopper to insure the carbons rising perpendicularly into the bell crank levers 47. The rods are held in the grooves and released therefrom by the bell crank levers 47 shown in detail in Figs. 8, 9 and 10 which will be described later. Holes 51 are cut in the plate 41 directly in line with the grooves 45 of the drum, so that the rods may be made to fall down the grooves through the plate to the dies 48. The dies 48 are fitted in equidistant holes in the drum 23 and held therein by washers 49. The openings of the dies are somewhat funnel-shaped at the mouth 50. Below the dies, grooves 52 are cut in the drum 23 and a conical surface 53 is provided at the base of the grooves. Beneath the hopper 46, no grooves are provided as none are needed.

Figure 3:
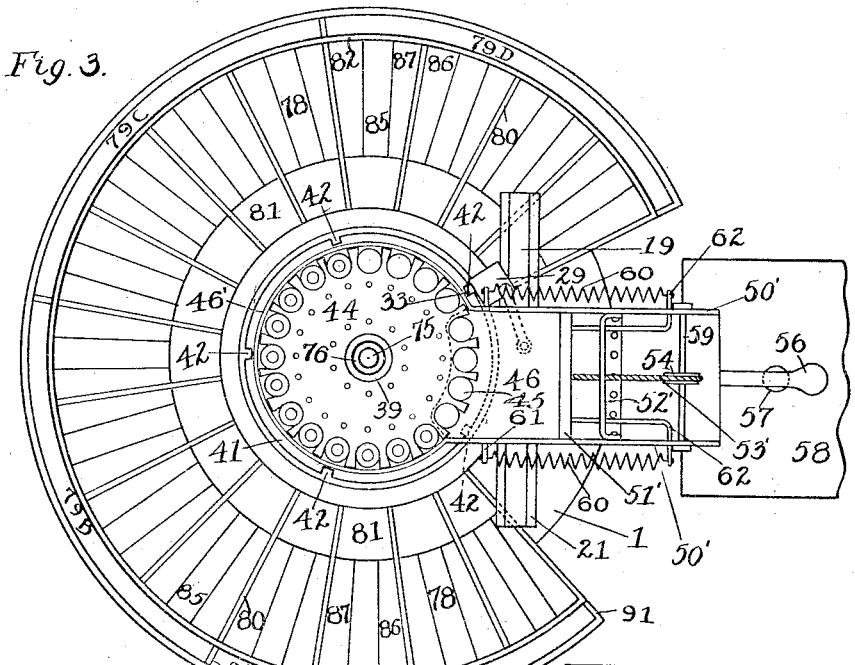
Fig. 3 is the top view of the apparatus shown in Figs. 1 and 2.

The hopper 46 shown in Figs. 1, 2, and 3 is fastened to the channel 21 by the braces 47′ fastened thereto by bolts 48′, and consists of a bottom member 49′ bolted to the braces, side pieces 50′ and two back boards 51′ and 52′. The back board 51′ is movable on the sloping bottom of the hopper and the back board 52′ is stationary and secured to the bottom and sides. The movable back is connected by a cord 53′ which is carried over the pulley 54 to a pedal 56 which is pivoted at 55. A spring 57 is connected to the base 58 and returns the pedal to the raised position after it is compressed. The pulley 54 is fastened to the rod 59 which is connected across the sides of the hopper. The springs 60 draw the board 51′ toward the drum 44 to force the rods into the grooves.

At one end the springs are connected to the lugs 61 connected at the side of the hopper and at the other end to the extension rods 62. These rods are fastened to the movable back and extend through holes in the stationary board and are movable in the slots 63 cut in the sides of the hopper. These slots are parallel to the sloping bottom of the hopper. The springs could be fastened directly to the movable back, but to enable a longer spring to be used, the extension rods 62 are preferable.

The internal moving parts, previously described briefly, consist in detail of the crank 64 connected at the end of the shaft 2 by a pin 65 fitted into the sleeve 66. The throw of this link is adjustable by means of a slot 67 and bolt 68. Usual washers 71 and sleeve 72 are provided at the bearing. The other end of the connecting rod is fastened by pin 73 to a projection 74 of the shaft 75. The shaft 75 is secured to the head 76' which moves on the internal surface of the supporting drum 1. The rods 92 are bolted in the head 76' and fastened by nuts 93. The rods pass through holes 94 in the drum 23 and up into the grooves. The shaft 75 extends through the sleeve 39 and is reciprocated by the action of the connecting rod and link. At the upper end of the shaft 75, a cam 76 is adjustably attached by the set screw 77. The cam actuates the bell cranks 47 to release the rods through the mechanism shown in Fig. 8. The upward motion of the rods 92 raises the articles which are being gaged but which do not pass through the dies thereunder. They are then lifted through the holes 51 and along the slots 45 to open the bell cranks as will be more fully described hereafter. The articles are thus reëngaged by the bell cranks.

Guideways 78 and receiving hoppers 79 are fastened to the supporting drum. The guideways consist of side pieces 80 and a sloping bottom 81 which guide the rods into the circumferential portion formed by the pieces 82 and 83, and bottom 84. Openings 85 are cut in the bottom 84, and together with sloping portions 86 and 87, form a bottom which is funnel shaped. Brackets 88 are fastened to the supporting drum to hold the guideways. The hopper 79 consists of a circumferential trough supported by the drum. Side pieces 91 are spaced apart so as to divide the hopper into four parts 79$^A$, 79$^B$, 79$^C$ and 79$^D$. The hopper 79 and guideways 78 occupy four-fifths of the circumference, it being unnecessary to provide these parts under the feeding hopper 46. Four guideways are provided for each receiving hopper 79$^A$, 79$^B$, 79$^C$ and 79$^D$, there being likewise the same number of grooves, dies, bell cranks, levers, and rods 92.

Referring to Fig. 4 which is a section on the line B B of Fig. 2 there are four groups of dies 95, 96, 97 and 98 of different size. Each group having four dies of equal size and extending around one-fifth of the drum circumference. There are no dies or rods 92 under the hopper 46.

In Figs. 8, 9 and 10, the mechanism for operating the bell cranks is shown in detail. These are fitted in the drum 44, slots 100, 101 and 102 being cut therein for this purpose. Slot 100 is cut radially and contains the spoke 103 while slot 102 cut circumferentially, contains the arcuate member 104 which is connected to the spoke. The bell cranks 47 are pivoted at 105 in the slots 101 and circumferential slot 102. Holes 106 are bored in the drum and contain the springs 107 which operate the bell cranks. The springs are held in place by the screws 108 which fit into the holes.

A hinge, 109 shown in detail in Fig. 11, is contained in the spoke 103 and allows it to actuate the arcuate member 104 only on the downward stroke of the shaft 75 and connected cam. The hinge consists of two portions 110 and 111 which are fitted together by a pin which passes through lugs 112, 113, and 114. The two faces 115 and 116 fit together so as to prevent the hinge from turning downward, while the two upper faces 117 and 118 are spread apart sufficiently to allow the member 110 to be raised upward a slight distance. This distance is sufficient to allow the cam 76 to pass on its upward stroke without moving the arcuate member. The plate 119 placed over the entire top of the drum 44 holds the bell cranks and operating mechanism in position. This plate is fastened to the drum by screws 120. Spaces 45' corresponding to the grooves in the drum are formed in the plate and allow the carbon rods 121 to project therethrough.

Referring to the enlarged view of the bell crank levers 47 shown in Fig. 10, the pins 105 which fit in the drum and plate are the axes upon which the levers revolve. The springs act on the ends 123 (Fig. 10) to push the cranks in contact with the carbons which are engaged by the projections 125. Other projections 124 engage the arcuate member 104. Projections 125 are beveled off at 126 to allow the rising carbons to open the catches as will be described later.

Figs. 12, 13, 14, 15, and 16 show several views of the catch 127 placed in the hole 128 in the drum 23 to retain the drum 44 stationary during a portion of the time. This catch engages the plate 41 of drum 44 by means of the lug 129 which fits into the notches 42 in the periphery thereof. The spring 130 which operates the catch 127 is preferably fitted in a hole in the bottom of the catch itself. Its spring action is exerted between the catch and the base of the hole 128 of the stationary drum 23 so that the lug 129 of the catch is continually pressed against the edge of the lower surface of the rotating plate 41. In this position the lug 129 can slip into a notch 42 when they are in corresponding positions. To disengage the lug, the arm 29 moves against the cam surface 131 during its return stroke. The catch 33 fits in the notch when the lug 129 is moved down by the arm.

The mode of operation of the machine is as follows: It will be assumed that the various parts are in the position shown in Fig. 1, and the direction of revolution as indicated by the arrow. The shaft 2 is rotated through approximately 90 degrees before the roller 6 engages the cam surface 16. During this movement, the shaft 75 has been moved downward one-half of its total travel and the cam lever 8 has remained stationary. The next movement of somewhat less than 90 degrees of the shaft causes the upper end of lever 8 to be moved through its total travel to the left. This movement, transmitted through the various links and slide to the arm 29 causes the drum 44 to be turned through an angle of 72 degrees or a space of four dies. Just as the drum reaches the end of this movement, lug 129 (Fig. 14) on the catch 127 enters one of the notches 42 and holds the drum and carbons in alinement with the dies beneath them. Simultaneously or immediately afterward, the cam 76 on the shaft 75 pushes inward on the arm 103 and moves the arcuate member 104 against the ends of the bell crank levers 47. This releases all the carbons, and they drop into the dies directly below.

To fill the drum, the operator presses downward on pedal 56 which pulls back the back board 51'. He then places a bundle of carbons in the hopper with the axes of the carbons parallel and in the same direction as the grooves 45 of the drum 44. The pedal is then released and the carbons are retained in a vertical position by the backboard 51'. The springs 60 force the back against the carbons where they are held against the drum and are either pushed at once into the slots 45 and engaged in the bell cranks or are later forced thereinto when the drum is moved by the arm 29. The carbons engage the rounded end 125 of the bell crank lever and the pressure of the springs 60 against the carbons is sufficient to cause them to push back the lever against the tension of the springs 107 and thus they are locked in the slots.

In the first set of four dies 95, having a diameter of .495, all of the carbons having this diameter or less will drop through the dies in the stationary drum and be deflected into the bin 79$^A$ by means of the conical surface 53 and guiding box 78. If any of the carbons have a greater diameter than .495, they will not pass through the dies, but will stick therein. The upper ends of the dies are slightly funnel shaped so that all carbons will wedge therein and be held in perpendicular position if they are too large to pass through. The succeeding movement of the shaft 2 through substantially 90 degrees causes no movement of the lever 8 and hence, the drum 44 is stationary. This follows from the fact that the cam surface 15 is concentric to the shaft 2 when the lower end of the cam lever has moved to the full extent to the right. The next movement of the shaft 2 through 90 degrees causes the upper end of the lever arm 8 to move toward the right on account of the roller 6 engaging the cam surface 14. During this movement, the catch 33 (Fig. 5) slides out of the notch 42 in the plate owing to the rear slanting surface 37 thereof and when the arm 29 approaches the backward limit of its movement it engages the cam surface 131 of the catch 127 and forces the lug 129 out of the notch 42. Further movement of the arm 29 causes the catch 33 to enter this notch. There is a short period when neither the lug nor the catch 33 engages the notch 42, but the tendency to rotate the drum backward by the slight friction of the catch 33 against the plate 41 would be resisted by the greater friction of the carbons in the hopper against the drum and by the inertia of the drum.

The arm is now set for another partial rotation of the drum. During this movement and the previous movement of 90 degrees of the shaft 2, the shaft 75 has caused the member 76' and the attached rods 92 to rise until they engage the carbons that have stuck in the dies. The upward movement of the rods finally forces the carbons again behind the bell crank catches of the drum. The cam surface 126 enables the upward thrust of the carbons to push the bell cranks back against the force of springs 107 as shown in Fig. 10. The carbons that were too large to pass through the 95 or .495 dies would therefore be pushed back into the drum again.

For the purpose of explanation, it will be assumed that in the first set of four, one carbon had a diameter of .493, the second a diameter of .497, the third a diameter of .502, and the fourth a diameter of .512. After this first revolution of shaft 2, it will be apparent that the carbon #1 has passed through the dies 95 and dropped into hopper 79$^A$. To prevent the upward movement of the cam 76, from needlessly operating the releasing member 104, the end of this lever is pivoted and arranged so that the upward engagement of the cam merely turns the hinged end on a pivot 109 and therefore does not operate the member. However, on the downward stroke, the pivoted end lies against the top of the drum 44 and the downward movement operates the releasing member.

The next revolution of shaft 2 will cause the parts to be operated exactly in the same way and another set of four carbons will be moved from the hopper and released over the first set of dies. The second set of carbons and all succeeding ones will operate exactly in the same way as the first set, and for convenience, the first only will be traced in the movement of the machine. Carbons #2, #3, and #4 will, in the meantime, have been moved over the second set of four dies 96 which have diameters of .500. When the cam 76 releases the catches, carbons #2, #3, and #4 of the first set will fall into the 96 or .500 dies. Carbon #2 was assumed to have a diameter of .497 and therefore, will pass through its die in the second set and fall through its slot in the stationary drum, and be deflected into its bin 79$^B$. Carbons #3 and #4, however, will stick in the 96 or .500 dies and will again be pushed up into the catches on the return movement of the rods 92.

The next movement of the drum will place carbons #3 and #4 over the third set of four dies 97 which have diameters of .505. When the cam 76 operates on the releasing member and bell cranks to free the carbons, they will drop into their corresponding dies. Since #3 was assumed to have a diameter of .502, it will pass through its die in this group and be deflected into the box or bin 79$^C$. Carbon #4 having a diameter of .512, will stick in its die and will be pushed back into the catch of the drum by the rods 92 on their return stroke. The next movement of the drum will place carbon #4 over one of the four 98 openings in the stationary drum which have no dies and when it is released by the cam 76 it falls directly through into the bin 73$^D$. No dies are placed in this part of the stationary drum 23 as all carbons having a greater diameter than .505 are to be dropped into the bin 73$^D$ regardless of how much they exceed this diameter. These carbons would be "scrapped."

In brief then, the operation of the machine is to drop the carbons into dies of successively increasing diameter until they engage the correct die. Until they are dropped into the correct die, they will be returned back into position to be redropped.

The operation of the machine is, therefore, continuous and entirely automatic. The carbons are forced into the slots in the drum 44 from the hopper and on each partial movement of the drum, four carbons are removed from the hopper and will be sorted eventually into their corresponding bin. The bins 73$^A$, 73$^B$, 73$^C$, and 73$^D$ will therefore be filled with carbons having diameters between .490 to .495; .495 to .500; .500 to .505; and over .505 respectively. The diameters of the carbons are arbitrarily assumed and the machine can be made to sort carbons of any diameter, and between any limits by using dies of certain diameters. It has been assumed that four carbons are fed from the hopper at each partial revolution of the drum but obviously eight or any number may be fed in like manner by properly constructing the machine.

This completes the operation involved in sorting four carbons and it will be noted that the entire periphery of the drum 44 is in use continuously, although I have simply followed four carbons from the time of leaving the hopper. Each revolution of the driving shaft 2 will feed four carbons out of the hopper and carbons will consequently be gaged at that rate. Of course it will be understood that this number is assumed merely as an illustration. The drum might be proportioned with 30, 42, 56, or as many dies as desired, depending upon the number of sizes into which the objects are to be sorted. Thirty dies would provide one-sixth section for the hopper and one-sixth of a section for each of the five large hoppers which will in turn be divided into five sections which will contain five dies of the same size. In such a machine, six revolutions of the shaft 2 would be required to produce one revolution of the drum.

In the practical operation of this machine, the dies, plate, cylinders and other parts may be easily removed and replaced to be adaptable for various sizes of rods. The machine is entirely automatic and it will only be necessary to place the rods in the feeding hopper and remove them from the hoppers at the bottom after being assorted.

Another modification somewhat similar to that previously described is shown in Figs. 17 to 21. In the description of this modification, I will describe only the features in which this apparatus differs from those already described.

Figure 18:
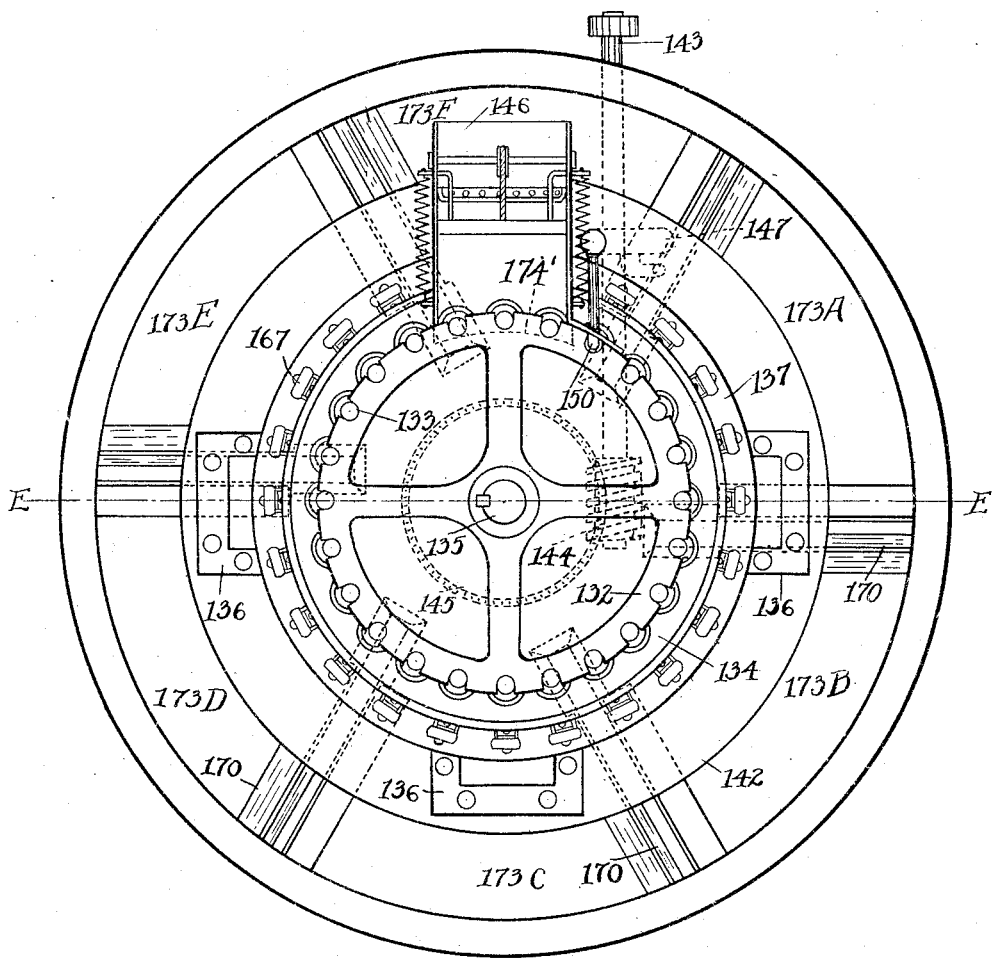
Fig. 18 is a top view of a form of apparatus embodying the principles of Fig. 17.

Referring particularly to Figs. 18 and 19, the drum 132 is keyed to a rotatable shaft 135 which has 24 grooves 133 cut therein although as in the previous modification, any number may be used. Plates 134 rigidly fastened to the shaft, carry split dies 174, 175, 176, 177 and 178. These are shown diagrammatically in Fig. 19. They are shown in detail in Figs. 20 and 21. The distance between the bottom of the dies in one carrying plate and the top of the die in the next carrying plate below is approximately the same as the length of the rods being gaged. The hopper 146 which has been previously described in detail with reference to another modification, is supported on one of the four standards 136 to which the cam rings 137, 138, 139, 140 and 141 are also fastened. Instead of standards, a cylindrical drum or other support could be used. This support rests upon the base 142. The circular cam rings are shown developed in Fig.

17. Shaft 135 is driven by shaft 143, worm 144 and gear 145. The shaft 135 may rest on the roller bearings 146 to reduce the friction.

Referring to Figs. 20 and 21, the die is divided into three parts 151 which are fitted into a holder 152. This holder rests in a hole bored into the plate 134 and is rigidly held therein by the collar 153 and nut 154. The die 151 is forced down into the die holder along the slanting surface 155 by the cap 156 to which two springs 157 are attached by means of pins 158. The cap 156 is movable up and down under the action of the springs, the pins moving in the slots 159. The die is opened by means of the hollow sleeve 160 and the conical surface 161 on the cap 156. The sleeve 160 is raised by the lugs 162 bolted to the inside of the arms 163 which are pivoted at 164. Pivot 164 is connected to the bolt 165 which also serves the purpose of connecting the plates 134 to the parts 166. The parts 166 are also shown in Fig. 19 and join the plates 134 to the shaft 135 so as to make them all move together. Wheel 167 turns on a projection 168 of the piece 169 joined to the end of the arms 163. The wheel 167 is moved along the cam surface 137 for instance and raises and lowers the lugs 162 on the arms 163. Motion transmitted from 162 is imparted to the sleeve 160 which in turn opens the dies by spreading them out on the slanting surfaces 155. The springs 157 press down on the cap 156 and the conical surface 161 thereon causes the die parts to follow the conical surface 155. The lugs 162, however, are placed in such a position that they will not interfere with the rods when they drop through the dies.

In Fig. 22, I have shown a perspective view with parts broken away of a hopper and guideway which may be used with either form of my device. The flanged portion 169 is placed directly under the dies and the rods slide down between the guide ways 170 to the platform 171. A slanting surface 172 then conducts the rods into the large holder 173 from which they may then be removed at intervals.

Figure 17:
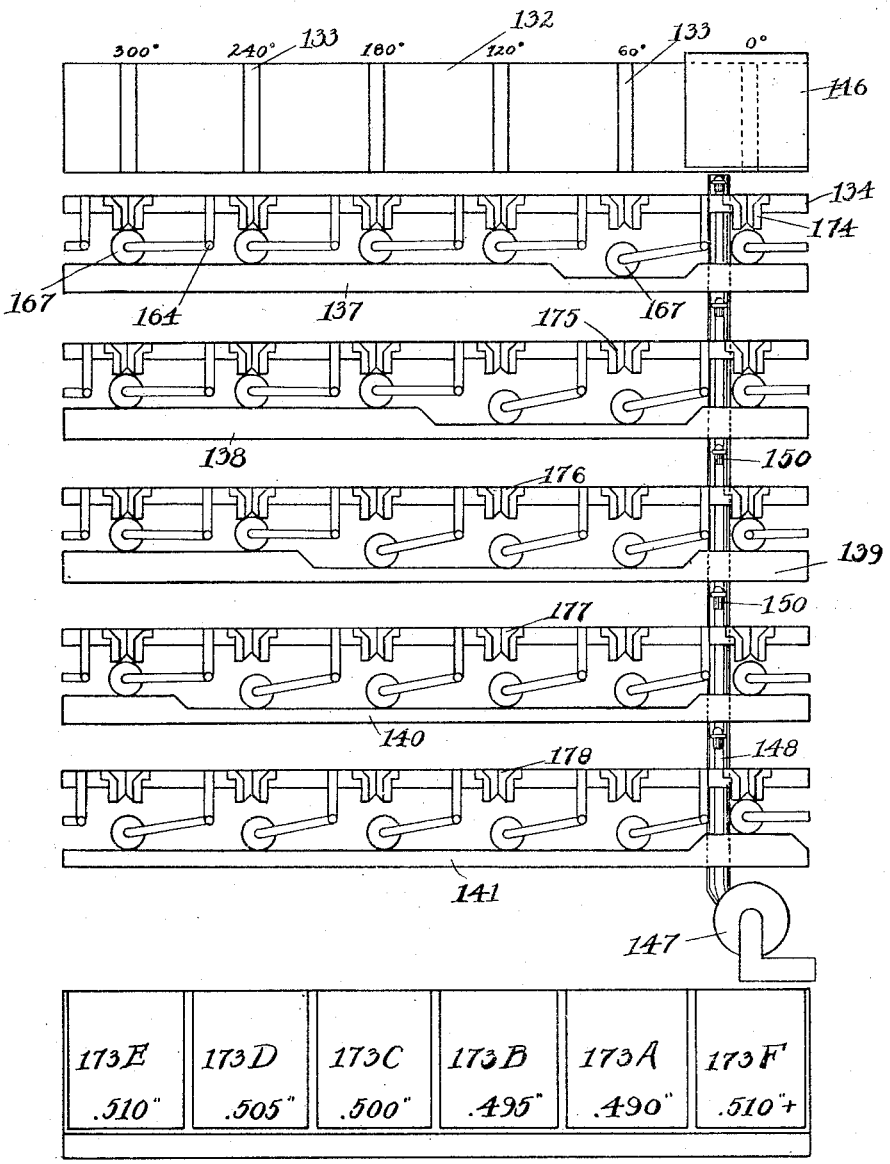
Fig. 17 is the developed view in elevation of a modified form of apparatus.

In Fig. 17, which is a partial development, only six grooves and six dies corresponding therewith are shown. In this view, the rollers 167 are illustrated as operating directly on the split dies instead of through the members 162 and 160. The dies are also shown more or less diagrammatically so as to give a ready understanding of the mode of operation. The details of the dies and opening means are shown in Figs. 20 and 21.

Figs. 18 and 19 show guide ways 170 and six hoppers—$173^A$, $173^B$, $173^C$, $173^D$, $173^E$, and $173^F$. The hoppers are fitted below the supporting base 142 as shown in dotted lines in Fig. 19.

In this modification all the dies 174 in the top plate 134 are assumed to have a diameter of .490 inches. The dies 175, 176, 177 and 178 are assumed to have a diameter of .495, .500, .505 and .510 respectively. There are five circular die carrying plates 134 and all the dies in each plate are of the same diameter.

Assuming that the rods are to be sorted into six groups, the operation of this modification is as follows:

The drum 132, dies 174, 175, 176, 177 and 178 and the opening means 167 will be continuously rotated, while the hoppers 146 and 173 and the cams 137, 138, 139, 140, and 141 will remain stationary. During the rotation, a rod will be fed into each groove 133 and then as soon as the drum is rotated sufficiently to clear the projection 174' on the side of the hopper, it will drop into the corresponding split die 174 thereunder, the diameter of which is assumed as .490. The position of the cam 137 and the opening means 167 are such that the die is closed at this position and will remain closed during the passage of the rod over the hopper $173^A$. If the rod will slide through, it will also drop directly into the hopper $173^A$ through the dies 175, 176, 177 and 178, the diameter of which has been assumed .495. .500, .505, and .510. If any rod is larger than .490, it will stick and then be rotated until it is over the hopper $173^B$. The split die 174 will be opened by the action of the cam 137 and the opening means. The rod is then released and falls into the die 175, the diameter of which has been assumed .495. If the rod is of sufficiently small diameter to drop through the die, it will pass through each of the larger dies below and be deposited into the hopper $173^B$. If, on the other hand, it will not pass through the 175 dies, it will be rotated until it comes over the hopper $173^C$. The dies 175 will then be opened and the rod be dropped into the .500 dies designated as 176 dies. If the rod is smaller than .500, it will drop into the hopper $173^C$, but if it sticks in that die, 176, it will be rotated until it is over the hopper $173^D$. The die will then be opened by the cam 139 and the opening means, and the rod released into the dies 177 having a diameter of .505. If it cannot pass through the 177 dies into the hopper $173^D$, it will be carried on until it is over the hopper $173^E$. The 177 dies will then be opened, and the rod dropped into the dies 178 of .510 diameter. If it passes through the 178 dies, it will then be deposited into the hopper $173^E$. All rods which will not pass through any of the preceding dies will be deposited in the hopper $173^F$.

The cam 137 in conjunction with springs 157, it will be noted, closes the dies 174 over the hopper 173ᴀ, but keeps them open during the rest of the revolution. Cam 138 and springs 157 keep the dies 175 closed over the hoppers 173ᴀ and 173ᴮ. Cam 139 closes dies 176 over the hopper 173ᶜ and they remain closed over the hoppers 173ᴀ, 173ᴮ, 173ᶜ. Cam 140 closes the dies 177 over the hopper 173ᴀ, 173ᴮ, 173ᶜ, and 173ᴰ. Cam 141 closes the dies over the hopper 173ᴱ and is closed over all the hoppers except 173ᶠ.

In this device, it will be advisable to use means for blowing dust and dirt out of the dies while they are open so that they will close to their true diameter. This is accomplished by the fan 147 and air pipes 148 and 150 placed in the position shown.

In the second modification, the split dies eliminate several of the parts used in the first described form of apparatus. The form of hoppers and means for opening and closing the split dies may be replaced by another means, and I have merely shown a simple and typical arrangement for performing this function.

Having described my invention, what I claim is:—

1. In apparatus for sorting articles, a plurality of dies consisting of circular openings of successively increasing size for passing cylindrical articles therethrough, a carrying member having a plurality of relatively long recesses adapted to be placed in alinement with the die openings, means for feeding articles into the recesses, and means for producing relative movement between the dies and carrying member.

2. In apparatus for sorting articles, a plurality of circular dies of successively increasing size, for passing cylindrical articles therethrough, a vertical drum having a plurality of grooves on its cylindrical surface, said grooves being adapted to be placed in alinement with the die openings, means for depositing the articles in the dies when the grooves are in alinement therewith, means for fitting the articles in the grooves and means for producing relative movement between the dies and the drum.

3. In apparatus for sorting articles, a plurality of circular dies of successively increasing size for passing cylindrical articles therethrough, a vertical drum having a plurality of grooves on its cylindrical surface, said grooves being adapted to be placed simultaneously in alinement with the die openings, means for depositing articles in the dies when the grooves are in alinement therewith, a hopper, means for moving the articles from the hopper into the grooves, and means for producing relative movement between the dies and the drum.

4. In apparatus for sorting articles, a plurality of dies of varying sizes, a movable member for carrying the articles to the dies and depositing them therein, means for removing the articles from the dies and depositing them in the movable member when they fail to pass through the dies, and means for feeding the articles into said movable member.

5. In apparatus for sorting articles, a plurality of dies of successively increasing size, means for carrying articles successively to said dies comprising a movable member having a plurality of recesses adapted to be placed in alinement with the dies, means for depositing them in the smallest die, means for removing the article and depositing it into the movable member whereby it is deposited into a die of larger size if it fails to pass through the smaller die.

6. In apparatus for sorting articles, a plurality of circular dies of successively increasing size, a member having a plurality of recesses for feeding the articles to the dies, said recesses being adapted to be placed in alinement with the dies, means for intermittently moving said member and means for pushing an article back into said member if it fails to pass through a die whereby it may be fed into another die.

7. In apparatus for sorting articles, a plate having a plurality of dies therein of varying size, a rotatable member for feeding the articles to the dies, and means for lifting an article back into the said member if it fails to pass through a die whereby it may be fed to another die.

8. In apparatus for sorting articles, a plurality of dies of successively increasing size, carrying means for said articles passing adjacent said dies in succession, means for releasing an article into the smallest die, means for replacing said article back into said carrying means if it fails to pass therethrough and means whereby it is deposited in succession in the other dies until it reaches one permitting it to pass through.

9. In apparatus for sorting articles, a plate having a plurality of dies therein of successively increasing size, a rotating drum having a plurality of grooves therein for feeding the articles to the dies, a reciprocating member for raising an article back into said grooves if it fails to pass through a die and means for depositing the article into dies of successively increasing size until it reaches one permitting it to pass therethrough.

10. In apparatus for sorting articles, a plurality of dies of successively increasing size, carrying means for said articles, said means having a plurality of catches for holding the articles, means for rotating said carrying means adjacent to the dies, means for releasing the catches when they are opposite the dies whereby the articles held therein are deposited in the adjacent dies, means for replacing all articles failing to pass therethrough back into said catches and means for receiving the articles passing through the dies.

11. In apparatus for sorting articles, a plurality of dies of successively increasing size, carrying means for said articles, said means having a plurality of catches for holding the articles, means for rotating said carrying means adjacent to the dies, means for releasing the catches when they are opposite the dies whereby the articles held therein are deposited in the adjacent dies, and means for replacing all articles failing to pass therethrough back into said catches.

12. In apparatus for sorting articles, a plurality of dies of successively increasing size, a rotating drum having grooves for carrying the articles, a plurality of catches for holding the articles in said grooves, means for rotating said drum over the dies, means for engaging the catches to release the articles to deposit them in the dies, means for replacing into the grooves all articles failing to pass through the dies, means for re-opening the catches to permit them to reëngage said articles and a plurality of hoppers for receiving the articles passing through dies of different sizes.

13. In apparatus for sorting articles, a stationary member containing a plurality of dies of successively increasing size, a movable member, catches in said movable member for holding articles therein, means for opening the catches to release the articles when they are above the dies, a plurality of rods for pushing all articles failing to pass through the dies back into said catches, and means whereby the articles are dropped successively into the dies until they reach one permitting them to pass through.

14. In apparatus for sorting articles, a member having a plurality of substantially equidistant recesses for receiving the articles, a support containing a plurality of substantially equidistant dies of varying sizes adapted to be placed in alinement with said recesses, means for retaining the articles in said recesses above the plane of the dies, means for simultaneously depositing the articles in the recesses into the dies and means for producing relative movement between the recessed member and the die carrying support.

15. In apparatus for sorting articles, a rotatable drum having a plurality of equidistant grooves at equal radius from the center of the drum for carrying the articles, a support containing a plurality of substantially equidistant dies of varying sizes adapted to be simultaneously placed in alinement with said grooves, means for retaining the articles in said grooves above the plane of the dies, means for simultaneously depositing the articles in the grooves into the dies, and means for feeding the articles into said drum.

16. In apparatus for sorting articles, a movable member having a plurality of substantially equidistant recesses for receiving the articles, a support containing a plurality of substantially equidistant dies of varying sizes adapted to be placed in alinement with said recesses, means for retaining the articles in the recesses, means for releasing the articles when the recesses are in alinement with the dies, means for simultaneously depositing the articles in the recesses into the dies, and means for producing relative movement between the recessed member and the die carrying support.

17. In apparatus for sorting articles, a drum having a plurality of substantially equidistant recesses for receiving the articles, a support containing a plurality of substantially equidistant dies of varying sizes adapted to be simultaneously placed in alinement with said recesses, means for retaining the articles in the recesses, means for simultaneously depositing the articles in the recesses into the dies, means for pushing an article back into a recess if it fails to pass through a die, means for feeding articles into the recesses and means for intermittently rotating the drum.

18. In apparatus for sorting articles, a stationary member containing a plurality of sets of dies of successively increasing size, a movable member, catches in the movable member for holding articles therein, means for feeding a plurality of articles into the movable member to be held by the catches, means for opening the catches when the articles are directly above the set of smallest dies whereby they are deposited therein, and a plurality of rods for replacing all articles failing to pass therethrough back into the catches.

19. In apparatus for sorting articles, a stationary member containing a plurality of sets of dies of successively increasing size, a movable member, catches in the movable member for holding articles therein, means for feeding a plurality of articles into the movable member to be held by the catches, means for opening the catches when the articles are directly above the set of smallest dies whereby they are deposited therein, and a plurality of rods for replacing all articles failing to pass therethrough back into the catches, and means for releasing said articles over dies of successively increasing size until they reach a die permitting them to pass through.

20. In apparatus for sorting articles, a stationary member containing a plurality of dies of successively increasing size, a movable member having catches for holding articles therein, a hopper for feeding the articles into the movable member, means for moving the movable member intermittently through a predetermined angle, means for opening the catches, a plurality of rods and means for pushing a rod through each die.

21. In apparatus for sorting articles, a circular plate containing a plurality of dies of successively increasing size spaced equal distances from the center and equal angular distances from adjacent dies, a rotatable member co-axial with said plate, having catches for holding articles therein, a hopper for feeding the articles into the rotating member, means for rotating said member intermittently through an angular distance which is an exact multiple of the angular distance between adjacent dies, and means for opening the catches when the articles are over the dies.

22. In apparatus for sorting articles, a circular member containing a plurality of dies of successively increasing size spaced equal distances from the center and equal angular distances from adjacent dies, a rotatable member co-axial with said first mentioned member having grooves in alinement with said dies and spaced apart equal angular distances, a plurality of catches for holding the articles in the grooves, means for rotating said second mentioned member intermittently through an angular distance which is an exact multiple of the angular distance between adjacent dies, and means for opening the catches.

23. In apparatus for sorting articles, a stationary member, a plurality of dies therein, a movable member having catches for holding articles therein, means for moving the second member a predetermined distance, a reciprocating shaft, a plurality of rods secured thereto and means on said shaft to open said catches.

24. In apparatus for sorting articles, a stationary member having a plurality of dies, a movable member having a plurality of catches for holding the articles, means for moving the second member a predetermined distance, a reciprocating shaft, a plurality of rods connected to move therewith, a member for releasing the catches and means coöperating with said shaft to operate said member only on one stroke of the shaft.

25. In an apparatus for sorting articles, means for receiving the articles, catches for holding them therein, a member for releasing the catches, a reciprocating shaft and means coöperating with said shaft for acting on said member to cause the opening of the catches.

26. In a member for receiving articles to be sorted, a bell crank lever adapted to retain an article, a member for operating said bell crank member, means for moving said member to engage the bell crank lever, and an intermediate member coöperating with said means and said first mentioned member, and means whereby the first mentioned means moves the first mentioned member every other time it engages the intermediate member.

27. In a member for receiving articles to be sorted, bell crank levers adapted to retain the articles, a member for engaging the ends of said bell crank levers, a lever pivoted to said member and a shaft adapted to be reciprocated, located adjacent said lever, and having means to operate it in its reciprocations.

28. In sorting apparatus, a cylindrical drum having grooves in its surface, bell crank levers pivoted to said drum with one end adjacent the grooves to hold articles therein, a plurality of dies adjacent said grooves and a member for engaging the other end of the bell crank levers to release the articles and drop them into the dies.

29. In apparatus for sorting articles, a rotating cylinder having a plurality of grooves in its cylindrical surface, a hopper containing the articles and inclosing a section of the cylinder, a movable back in the hopper, a spring secured to said back to force it against the articles in the hopper, and means for operating the back in opposition to said spring.

In testimony whereof, I hereunto affix my signature in the presence of two witnesses.

WILLIAM SHAW.

Witnesses:
 IRA J. ADAMS,
 H. G. GROVER.

Copies of this patent may be obtained for five cents each, by addressing the "Commissioner of Patents, Washington, D. C."